(12) United States Patent
Jones, Sr. et al.

(10) Patent No.: US 12,589,712 B2
(45) Date of Patent: Mar. 31, 2026

(54) VEHICULAR CRIME MITIGATION SYSTEM

(71) Applicants: Reginald S. Jones, Sr., Naperville, IL (US); Estrelitta Harmon, Naperville, IL (US); Susan E. Jones, Naperville, IL (US); Reginald S. Jones, Jr., Naperville, IL (US)

(72) Inventors: Reginald S. Jones, Sr., Naperville, IL (US); Estrelitta Harmon, Naperville, IL (US); Susan E. Jones, Naperville, IL (US); Reginald S. Jones, Jr., Naperville, IL (US)

(73) Assignee: JGR Software Group LLC, Chicago, IL (US)

( * ) Notice: Subject to any disclaimer, the term of this patent is extended or adjusted under 35 U.S.C. 154(b) by 0 days.

(21) Appl. No.: 19/016,090

(22) Filed: Jan. 10, 2025

(65) Prior Publication Data

US 2025/0229745 A1    Jul. 17, 2025

Related U.S. Application Data

(60) Provisional application No. 63/620,273, filed on Jan. 12, 2024.

(51) Int. Cl.
| | |
|---|---|
| *B60R 25/102* | (2013.01) |
| *H04L 9/00* | (2022.01) |
| *B60R 25/10* | (2013.01) |
| *B60R 25/33* | (2013.01) |

(52) U.S. Cl.
CPC .............. B60R 25/102 (2013.01); H04L 9/50 (2022.05); *B60R 2025/1016* (2013.01); *B60R 25/33* (2013.01); *H04L 2209/84* (2013.01)

(58) Field of Classification Search
CPC ......... G04L 29/00; G04L 29/06; G04L 29/08; G06F 11/30; G06F 11/3013; G05D 1/00; G05D 1/0088; H04L 9/50; B60R 25/10; B60R 25/102; B60R 25/25; B60R 25/252; B60R 25/33; B60Q 1/00
See application file for complete search history.

(56) References Cited

U.S. PATENT DOCUMENTS

| | | | | |
|---|---|---|---|---|
| 5,900,805 | A * | 5/1999 | Knight | .................... B60R 25/10 |
| | | | | 340/425.5 |
| 2006/0049925 | A1* | 3/2006 | Hara | ........................ B60R 25/25 |
| | | | | 340/435 |
| 2020/0336541 | A1* | 10/2020 | Naderi Alizadeh | ..... H04W 4/38 |
| 2024/0308513 | A1* | 9/2024 | Gupta | ................... B60W 40/02 |

* cited by examiner

*Primary Examiner* — Van T Trieu
(74) *Attorney, Agent, or Firm* — Barnes & Thornburg LLP

(57)    ABSTRACT

Technologies for mitigating vehicular crime includes a server and an in-vehicle device configured to monitor a vehicle. The server receives present trip information of a mobile device of a user of the vehicle. The server monitors the vehicle and surroundings of the vehicle. Upon detection of anomalous activity at the vehicle and the surroundings, the server transmits the present trip information to one or more alert recipient entities. The server records the present trip information of the user in a blockchain.

17 Claims, 6 Drawing Sheets

400

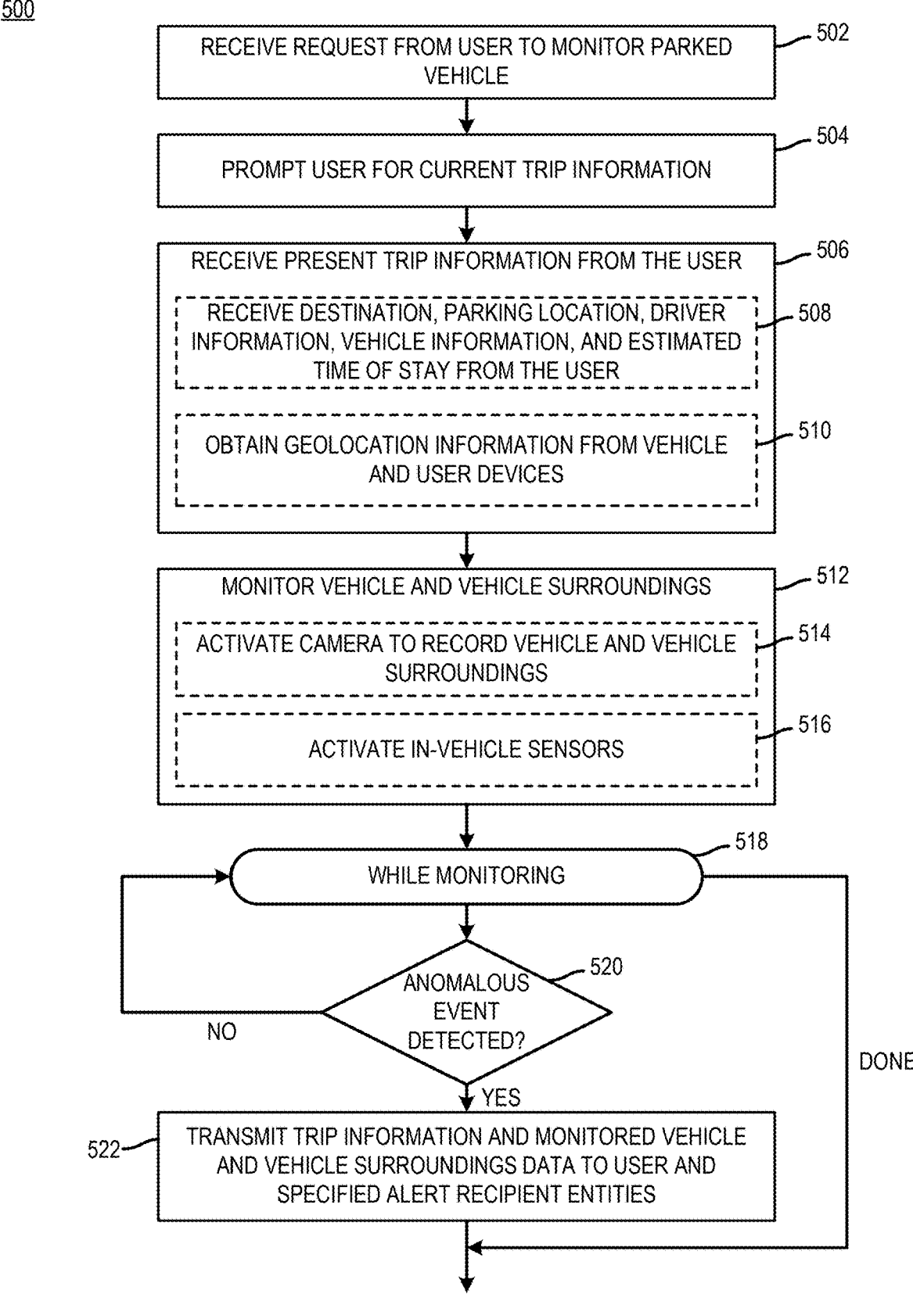

500

502 — RECEIVE REQUEST FROM USER TO MONITOR PARKED VEHICLE

504 — PROMPT USER FOR CURRENT TRIP INFORMATION

506 — RECEIVE PRESENT TRIP INFORMATION FROM THE USER

508 — RECEIVE DESTINATION, PARKING LOCATION, DRIVER INFORMATION, VEHICLE INFORMATION, AND ESTIMATED TIME OF STAY FROM THE USER

510 — OBTAIN GEOLOCATION INFORMATION FROM VEHICLE AND USER DEVICES

512 — MONITOR VEHICLE AND VEHICLE SURROUNDINGS

514 — ACTIVATE CAMERA TO RECORD VEHICLE AND VEHICLE SURROUNDINGS

516 — ACTIVATE IN-VEHICLE SENSORS

518 — WHILE MONITORING

520 — ANOMALOUS EVENT DETECTED?

NO

YES

DONE

522 — TRANSMIT TRIP INFORMATION AND MONITORED VEHICLE AND VEHICLE SURROUNDINGS DATA TO USER AND SPECIFIED ALERT RECIPIENT ENTITIES

VEHICULAR CRIME MITIGATION SYSTEM

CROSS-REFERENCE TO RELATED APPLICATIONS

This application claims priority to U.S. Provisional Patent Application No. 63/620,273, filed Jan. 12, 2024, which is incorporated by reference herein in its entirety.

FIELD

Embodiments disclosed herein generally relate to vehicle technologies, and more specifically, to a system and related technologies for mitigating occurrences of vehicular property crime such as theft and vandalism.

BACKGROUND

Vehicular crime, such as burglary, carjacking, and vandalism has increasingly become a problem to personal safety and property. Conventional monitoring and response systems are inadequate in the event that a vehicle theft occurs. For example, current in-vehicle security systems are unable to adequately detect carjacking scenarios (e.g., actions in which a perpetrator violently commandeers and then steals an occupied vehicle) due to the unpredictability of patterns associated with such occurrences. In such occurrences, alerting relevant law enforcement authorities and other entities (e.g., insurance agencies, child abduction emergency services, medical emergency services, and so on) may happen after a considerable amount of time has passed, as typically in a carjacking, drivers and passengers are separated from their own belongings, including their mobile devices. The passage of time between the vehicle theft and reporting to law enforcement caused by the inadequacy of prior art solutions can adversely impact the ability of law enforcement to catch and arrest the perpetrator and/or recover the stolen vehicle, to the detriment of the vehicle's owner and society as a whole.

SUMMARY

One embodiment presented herein discloses a system for mitigating occurrences of vehicular crime. The system generally includes an in-vehicle device configured to monitor a vehicle. The system also includes a server having one or more processors and a memory storing instructions. The server receives present trip information of a mobile device of a user of the vehicle. The server monitors the vehicle and surroundings of the vehicle. Upon detection of anomalous activity at the vehicle and the surroundings, the present trip information is transmitted to one or more alert recipient entities. The present trip information of the user is recorded in a blockchain.

Another embodiment presented herein discloses a computer-readable storage medium storing instructions. The instructions, when executed on one or more processors, causes a server to receive present trip information of a mobile device of a user of the vehicle. The server monitors the vehicle and surroundings of the vehicle. Upon detection of anomalous activity at the vehicle and the surroundings, the present trip information is transmitted to one or more alert recipient entities. The present trip information of the user is recorded in a blockchain.

Yet another embodiment presented herein discloses a method for mitigating occurrences of vehicular crime. The method generally includes receiving present trip information of a mobile device of a user of the vehicle. The method also generally includes monitoring the vehicle and surroundings of the vehicle. Upon detecting anomalous activity at the vehicle and the surroundings, the present trip information is transmitted to one or more alert recipient entities. The present trip information of the user is recorded in a blockchain.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is a flow diagram of a method for mitigating vehicle burglary occurrences, according to an embodiment of the system.

DETAILED DESCRIPTION

Figure 1:
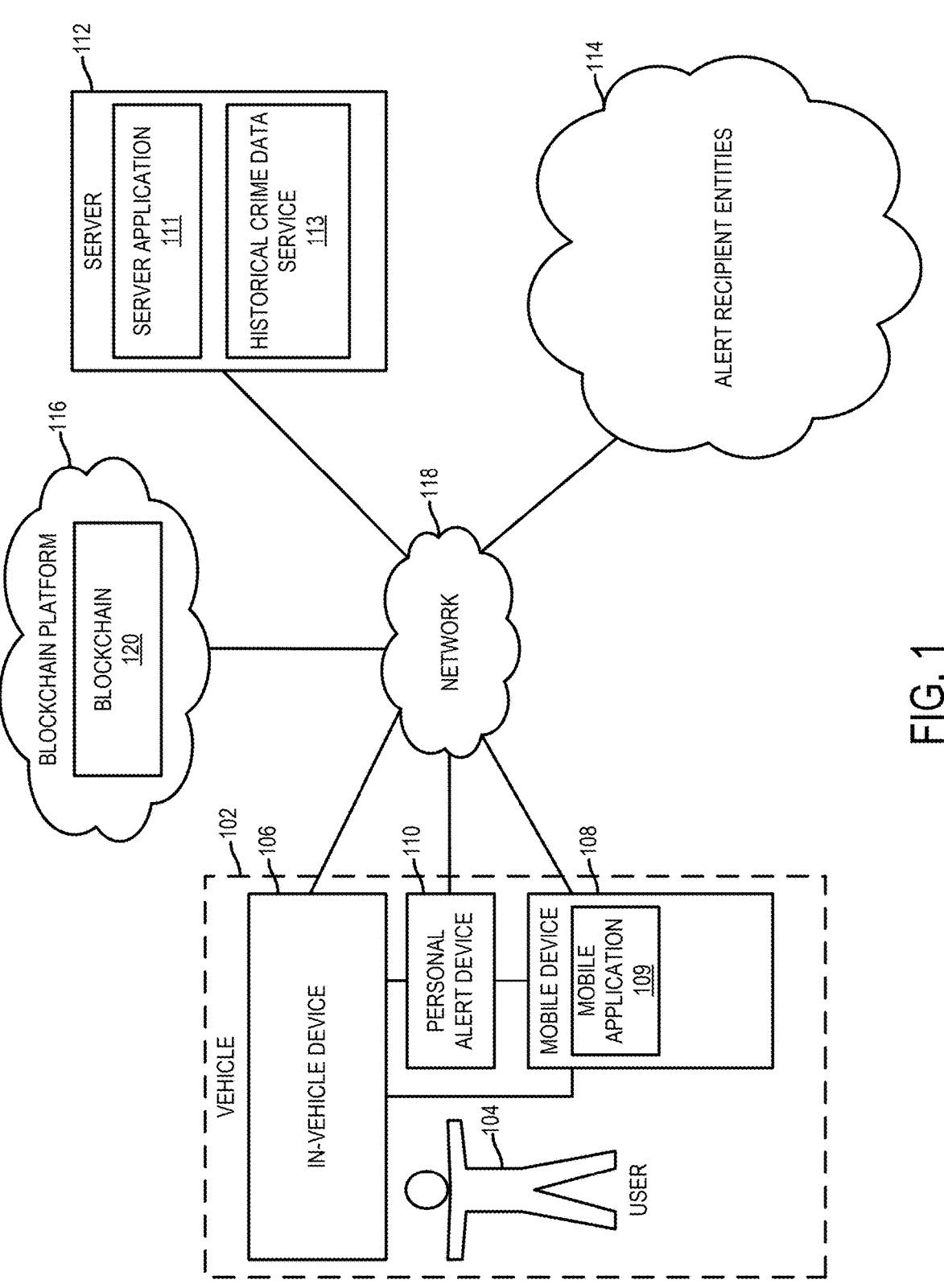
FIG. 1 illustrates an exemplary environment of an inventive system for mitigating occurrences of vehicular crime.

Embodiments presented herein disclose systems and techniques for mitigating occurrences of vehicular property crime, such as theft (e.g., car burglary, carjacking, etc.) and vandalism. The techniques of the present disclosure provide an in-vehicle device that may be integrated within a vehicle and/or other systems within the vehicle (e.g., navigation systems, infotainment systems, and the like) having network connectivity. The network connectivity enables the in-vehicle device to communicate with user devices (e.g., mobile devices, alert devices and other wearable devices, etc.) and external computing systems (e.g., servers that manage system operations for vehicle mitigation). As further described herein, the in-vehicle device may execute one or more mitigation workflows when detecting that a vehicular crime has occurred or that a vehicle is entering a location where vehicular crimes have historically occurred within a given time frame.

Further, the techniques of the present disclosure also provide a mobile application having an interface that enables a user to interact with the in-vehicle device and other external devices (e.g., servers, wearable devices, etc.) before, during, and after a mitigation workflow has been activated. Further still, the techniques of the present disclosure also provide a wearable device that can assist a user in communicating with authorities and other relevant parties upon a mitigation workflow (e.g., a carjacking mitigation workflow) being triggered.

Advantageously, the systems and techniques disclosed herein provide rapid response workflows to alert relevant authorities and entities upon occurrence of a vehicular property crime incident. By collecting user data that is relevant to such entities, including vehicle location, trip information, captured image and video information, and the like, law enforcement and other agencies can more efficiently mobilize to address the incident. Further advantageously, the systems and techniques disclosed herein provide secure methods (e.g., using encryption and blockchain-based storage) for storing user data to ensure that data associated with a given user is attestable and securely stored. Such secure methods are important to ensure evidentiary chain-of-command in the event that such data is used following an incident, while also maintaining data integrity and privacy compared to prior art methods that use fewer security layers to store the user data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing environment providing a system 100 for mitigating occurrences of vehicular property crime (e.g., burglary, vandalism, carjacking, etc.) is shown. Illustratively, the system 100 includes a vehicle 102, a server 112, one or more alert recipient entities 114, and a blockchain platform 116, each interconnected via a network 118 (e.g., the Internet, a local area network, private network, etc.).

As used herein, the vehicle 102 may be embodied as any machine that is driven, operated, or controlled by a user (a driver). For example, the illustrative vehicle 102 can be an automobile, motorcycle, truck, bus, airplane, helicopter, blimp, balloon, glider, boat, ferry, train, heavy equipment or machinery, and so on. The vehicle 102 may include one or more components that are able to communicate with the network 118. As shown, the vehicle 102 may include an in-vehicle device 106, a mobile device 108 of a user 104, and a personal alert device 110 worn (or otherwise possessed) by the user 104.

The in-vehicle device 106 may be embodied as a hardware device capable of performing the functions disclosed herein, including obtaining information associated with the vehicle 102 and the user 104. The in-vehicle device 106 may be communicatively coupled with the vehicle 102, such as by connection with a controller area network (CAN) bus of the vehicle 102, connection with the on-board diagnostics (OBD) port of the vehicle 102, integration with a rear-view mirror of the vehicle, etc. In some embodiments, the in-vehicle device 106 may be powered by the vehicle 102, such as via a 12V socket (e.g., a cigarette lighter socket), hard-wired with a fuse box of the vehicle 102, or through connection with the OBD port.

The mobile device 108 may be embodied as a physical device (e.g., a smartphone device, tablet device, wearable, personal computer, and the like) or as a virtual computing instance (e.g., executing on a cloud). The mobile device 108 includes a mobile application 109, which provides a user interface for communication with the in-vehicle device 106, personal alert device 110, and server 112, as well as for performance of the functions described herein, such as encrypting and storing user data on the blockchain platform 116, enabling voice communication between the user 104 and the in-vehicle device 106, and displaying notifications transmitted from the server 112.

The personal alert device 110 may be embodied as a hardware-based wearable device that transmits notification signals to the in-vehicle device 106 and/or mobile device 108 via a wireless protocol (e.g., Bluetooth, near field communication (NFC)), or directly (via the network 118) to the alert recipient entities 114. For example, the personal alert device 110 may be a key fob device that can be attached to a keychain of a user 104, smart watch, smart ring, smart necklace, smart pendant, and the like. In some embodiments, software logic incorporated in the personal alert device 110 may be installed in the mobile device 108 or another wearable device of the user 104. The personal alert device 110 may include a button that a user 104 may engage (e.g., through touch, press, etc.) to transmit a notification to alert recipient entities 114 and the server 112. In some embodiments, the personal alert device 110 may include a network interface that allows for cellular connectivity and enables the personal alert device 110 to communicate with the in-vehicle device 106, mobile device 108, server 112, and alert recipient entities 114. In some embodiments, the personal alert device 110 may be linked to a 24/7 response service that contacts the alert recipient entities 114 on behalf of the user 104. The personal alert device 110 may also include Global Positioning System (GPS) components to enable alert recipient entities 114 to identify a geolocation of the personal alert device 110.

The in-vehicle device 106 may include sensors and components for detecting the location and position of the vehicle 102. In addition, the in-vehicle device 106 may include one or more audio and video sensors, such as camera devices to capture audiovisual data of the vehicle 102 and its surroundings. In an embodiment, the in-vehicle device 106 may be in communication with other in-vehicle sensors (e.g., cameras) and external cameras in the vehicle to further capture audiovisual data. In an embodiment, the in-vehicle device 106 may integrate with telematics and/or tollway transponder equipment installed in the vehicle 102.

The server 112 may provide a platform in which profile and activity data associated with the user 104 is managed by a server application 111. The server application 111 may receive user profile and activity from the mobile application 109 and store the data on the blockchain platform 116. The server application 111 may perform storage and retrieval operations with a blockchain platform 116 for such data and distribute such data over secure channels with the alert recipient entities 114.

In an embodiment, the server 112 may be centrally located or can comprise multiple servers 112. For example, in the latter situation, the server 112 (or operations performed by the server 112) may be part of a cloud and edge networking scheme in which a server 112 (e.g., a physical computing server or a virtual computing instance) is hosted on edge networks, such that data transmitted by the vehicle 102 (or networked components therein). By situating servers 112 on edge networks, the in-vehicle device 106, mobile device 108, and other networked components are able to transmit user data and alert data to servers 112 in relatively close networked proximity, allowing for relatively improved transmission and potentially faster response time from alert recipient entities 114, e.g., in the event of a vehicle theft incident.

Further, the server 112 includes a historical crime data service 113, which may be embodied as any type of hardware, software, or circuitry for providing statistical crime data based on various locations. For example, the historical crime data service 113 may maintain a database that lists entries by incident (e.g., vehicle burglary, carjacking, assault, robbery, etc.) and geographical location (e.g., by zip code, geographical coordinates, ward, district, etc.). The historical crime data service 113 may handle requests via an application programming interface (API) from the server application 111, mobile application 109, in-vehicle device 106, etc.

The alert recipient entities 114 may comprise alert systems maintained by law enforcement agencies, automobile insurance agencies, emergency services organizations, Department of Transportation, and the like. In an embodiment, the alert systems may be integrated with the techniques described herein (e.g., with alert software maintained by the respective entities 114). In an embodiment, the alert systems may provide notification interfaces, such as email or other messaging interfaces capable of receiving alerts from the in-vehicle device 106, mobile device 108, and/or personal alert device 110 in the form of a text communication, such as a text message, email, and the like.

In an embodiment, the mobile device 108 may include a mobile application 109 that communicates with the in-vehicle device 106, personal alert device 110, and the server 112. The mobile application 109 provides a graphical user interface (GUI) that allows a user to input user information such as personally identifiable information (e.g., name, passenger information, driver information, driver's license information, address information, phone number information, payment information, user image data, passenger image data, user voice data, passenger voice data, and the like) to be stored locally in a user profile and as part of the blockchain platform 116. The GUI also allows the user to input vehicle information, such as a make, model, vehicle identification number, license plate number, vehicle color, type of vehicle, and designated driver information to be stored locally in the user profile and as part of the blockchain platform 116. The GUI also allows the user to input, e.g., at the time of travel or parking the vehicle 102, trip information. Trip information may include a destination, estimated time of arrival, geolocation data obtained from the mobile device 108, parking lot information, passenger information, and the like. In an embodiment, the mobile application 109 may be integrated with GPS components and software of the mobile device 108, in-vehicle components of the vehicle 102, and the in-vehicle device 102 to obtain geolocation information associated with the vehicle 102 in real-time.

In an embodiment, the GUI of the mobile application 109 may also display crime statistics and notifications describing personal safety risks to the user 104 as the user 104 approaches a given area. For example, the mobile application 109 may detect, using present geolocation data obtained by the mobile device 108, that the user 104 is entering an area where crime incidents for certain categories (e.g., car theft, burglary, vandalism, assault, etc.) exceeds a particular threshold. In an embodiment, the mobile application 109 may retrieve crime incidents retrieved from the historical crime data service 113 or other online databases.

In another embodiment, the server application 111 may retrieve the crime statistics (e.g., crime incidents by type and area) and transmit them to the mobile application 109. In another embodiment, the server application 111 and mobile application 109 may use artificial intelligence (AI) and machine learning-based models to learn crime statistics in real-time and identify routes to a destination (or identify a final destination) of the user 104 that may be associated with a high risk. For example, the server 112 may include AI/machine learning logic used to train learning models and deploy such models in identifying high-risk routes. In addition, the server application 111 and mobile application 109 may use such techniques to identify relatively low-risk routes to a destination or destinations for parking the vehicle 102.

In an embodiment, the in-vehicle device 106 may include logic (e.g., software, circuitry, etc.) to detect anomalous events corresponding to vehicle theft incidents, such as car burglary, break-ins, vandalism, and carjacking. In an embodiment, to do so, the in-vehicle device 106 may include pattern data associated with normal behavior as well as pre-defined anomalous behavior (e.g., unknown persons, noises associated with break-ins, unexpected motions, etc.). In detecting such anomalous events, the in-vehicle device 106 may be configured to generate and send an alert to the server 112 and alert recipient entities 114.

The illustrative blockchain platform 116 represents a decentralized blockchain network platform on which blockchain-based applications and services may execute. In an embodiment, the blockchain platform 116 is an Ethereum Virtual Machine (EVM)-compatible blockchain subnet that is scalable. The blockchain platform 116 includes one or more blockchains 120 on which various types of user and vehicle data may be stored. For example, the blockchains 120 may store information regarding trips associated with a user as separate entries on a given chain. Entries can indicate trip information such as date, time started, time completed, trip route, passengers, driver, vehicle make and model, whether a vehicular crime incident occurred, and the like.

Figure 2:
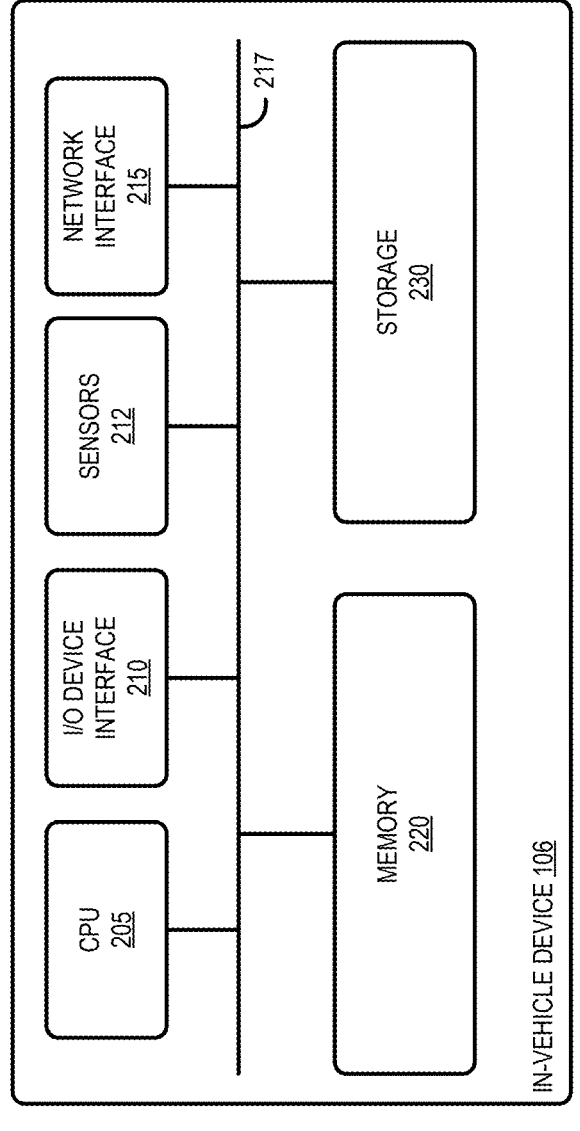
FIG. 2 is a block diagram of an exemplary embodiment of the in-vehicle device of the system shown in FIG. 1.

FIG. 2 further illustrates the in-vehicle device 106. As shown, in-vehicle device 106 includes, without limitation, a central processing unit (CPU) 205, input/output (I/O) device interface 210, one or more sensors 212, a network interface 215, a memory 220, and a storage 230, each interconnected via a hardware bus 217. Of course, the actual in-vehicle device 106 will include a variety of additional hardware components not shown. Additionally, in some embodiments, one or more of the illustrative components may be incorporated in, or otherwise form a portion of, another component.

The CPU 205 retrieves and executes programming instructions stored in the memory 220. The CPU 205 may be embodied as one or more processors, each processor being a type capable of performing the functions described herein. For example, the CPU 205 may be embodied as a single or multi-core processor(s), a microcontroller, or other processor or processing/controlling circuit. In some embodiments, the CPU 205 may be embodied as, include, or be coupled to a field programmable gate array (FPGA), an application-specific integrated circuit (ASIC), reconfigurable hardware or hardware circuitry, or other specialized hardware to facilitate performance of the functions described herein. The hardware bus 217 is used to transmit instructions and data between the CPU 205, storage 230, network interface 215, and the memory 220. CPU 205 is included to be representative of a single CPU, multiple CPUs, a single CPU having multiple processing cores, and the like. The memory 220 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

The network interface 215 may be embodied as any hardware, software, or circuitry (e.g., a network interface card) used to connect the in-vehicle device 106 over the network 118 and providing the network communication component functions described above. For example, the network interface 215 may be embodied as any communication circuit, device, or collection thereof, capable of enabling communications over the network 118 between the in-vehicle device 106 and other devices (e.g., the personal alert device 110, mobile device 108, server 112, etc.). The network interface 215 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication. For example, to do so, the network interface 215 may include a network interface controller (NIC, not shown), embodied as one or more add-in-boards, daughtercards, controller chips, chipsets, or other devices that may be used by the in-vehicle device 106 for network communications with remote devices. For example, the NIC may be embodied as an expansion card coupled to the I/O device interface 210 over an expansion bus such as PCI Express.

The I/O device interface 210 allows the sensors 212 to communicate with hardware and software components of the in-vehicle device 106. For example, the I/O device interface 210 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O device interface 210 may form a portion of a system-on-a-chip (SoC) and be incorporated, along with one or more of the CPU 205, the memory 220, and other components of the in-vehicle device 106. The sensors 212 may be embodied as any type of motion sensors, audiovisual sensors (e.g., cameras, microphones), accelerometers, gyroscopes, and the like provided as a component to the in-vehicle device 106.

In an embodiment, the I/O device interface 210 may be coupled with a speaker that allows for audio output from the in-vehicle device 106. For example, the mobile application 109 may include a one-way walkie talkie feature to allow direct voice communication from the in-vehicle device 106 (e.g., by a user 104, law enforcement personnel, etc.) with 154 MHz to 900 MHz frequency range.

The storage 230 may be embodied as any type of devices configured for short-term or long-term storage of data such as, for example, memory devices and circuits, memory cards, hard disk drives (HDDs), solid-state drives (SSDs), or other data storage devices. The storage 230 may include a system partition that stores data and firmware code for the storage 230. The storage 230 may also include an operating system partition that stores data files and executables for an operating system.

Figure 3:
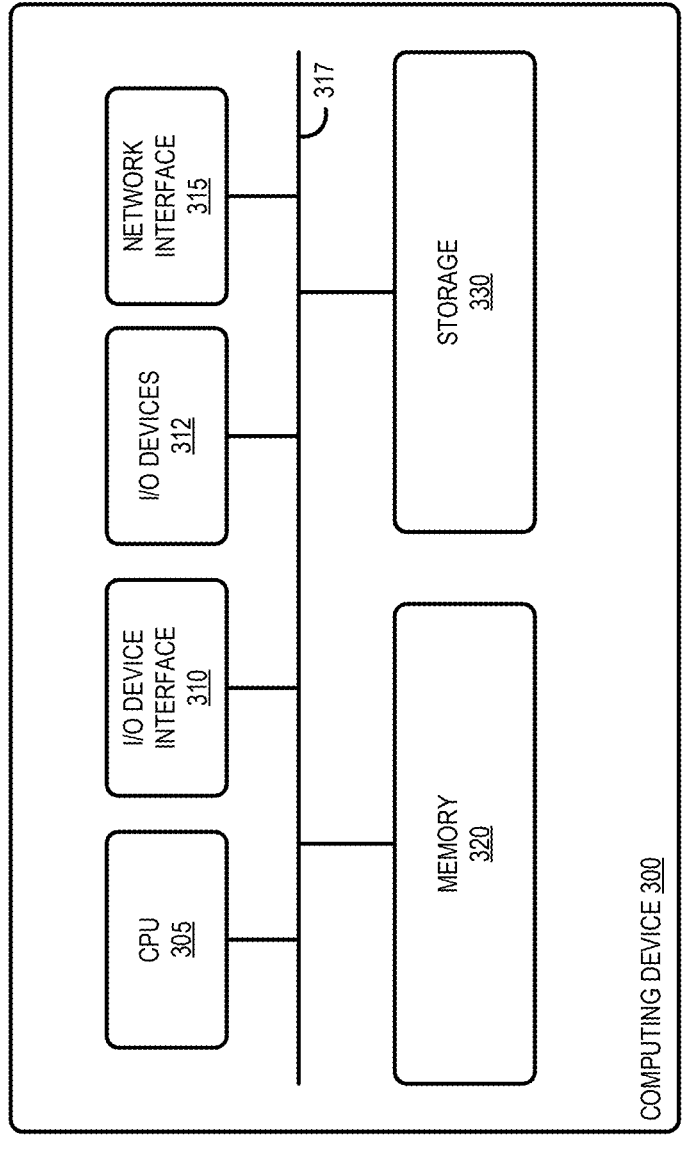
FIG. 3 is a block diagram of an exemplary embodiment of the server of the system shown in FIG. 1.

FIG. 3 further illustrates the server 112. As shown, server 112 includes, without limitation, a central processing unit (CPU) 305, an input/output (I/O) device interface 310, one or more I/O devices 312, a network interface 315, a memory 320, and a storage 330, each interconnected via a hardware bus 317. Of course, the actual server 112 will include a variety of additional hardware components not shown. Additionally, in some embodiments, one or more of the illustrative components may be incorporated in, or otherwise form a portion of, another component.

The CPU 305 retrieves and executes programming instructions stored in the memory 320. The CPU 305 may be embodied as one or more processors, each processor being a type capable of performing the functions described herein, and is similar to the CPU 205 described relative to FIG. 2. The hardware bus 317 is used to transmit instructions and data between the CPU 305, storage 330, network interface 315, and the memory 320. The memory 320 may be embodied as any type of volatile (e.g., dynamic random access memory, etc.) or non-volatile memory (e.g., byte addressable memory) or data storage capable of performing the functions described herein, and is similar to the memory 220 described relative to FIG. 2.

The network interface 315 may be embodied as any hardware, software, or circuitry (e.g., a network interface card) used to connect the server 112 over the network 118 and providing the network communication component functions described above. The network interface 315 is similar to the network interface 215 described relative to FIG. 2.

The I/O device interface 310 allows the I/O devices 312 to communicate with hardware and software components of the server 112 and is similar to the I/O device interface 210 of FIG. 2. The I/O devices 312 may be embodied as any type of I/O device connected with or provided as a component to the server 112. I/O devices such as keyboards, mice, and printers may be included as I/O devices 312.

The storage 330 may be embodied as any type of devices configured for short-term or long-term storage of data such as, for example, memory devices and circuits, memory cards, hard disk drives (HDDs), solid-state drives (SSDs), or other data storage devices and is similar to the storage 230 described relative to FIG. 2.

Figure 4:
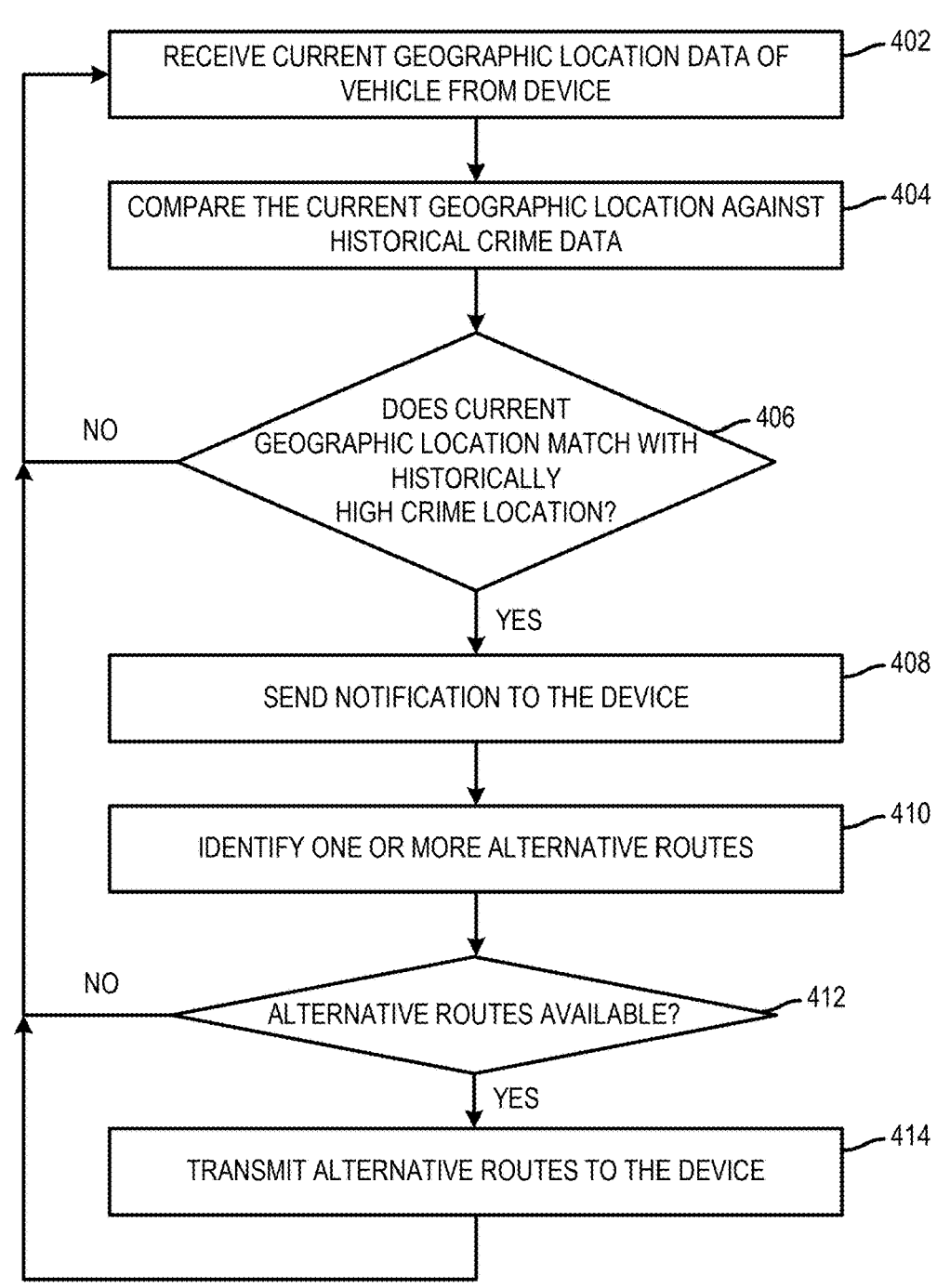
FIG. 4 is a flow diagram of a method for generating vehicle notifications for mitigating vehicle crime according to an embodiment of the system.

Referring now to FIG. 4, the server application 111 (or mobile application 109 in some embodiments), in operation, performs a method 400 for generating vehicle notifications for mitigating vehicle crime. As shown, the method 400 begins in block 602, in which the server application 111 receives data associated with a current geographic location of the vehicle 102, e.g., from the in-vehicle device 106 or the mobile application 109. For example, the mobile application 109 may obtain current geolocation data (e.g., based on sensor measurements and GPS coordinates provided by the mobile device 108) and periodically transmit the geolocation data to the server application 110. Similarly, the sensors of the in-vehicle device 106 may obtain current geolocation data for periodic transmission to the server application 111.

In block 404, the server application 111 compares the location data against location data provided by the historical crime data service 113. For example, to do so, the server application 111 may generate a query to be submitted to the historical crime data service 113 that includes at least a portion of the current geolocation data (e.g., a zip code, a radius of a specified measure that incorporates the respective coordinates of the current geolocation data, etc.). Further, the server application 111 may specify filters for the type of crime to retrieve, such as burglary, vandalism, carjacking, etc. Further still, the server application 111 may specify a recency or date range to avoid receiving outdated results. The historical crime data service 113 may return results to the server application 111 in a variety of formats. For example, the historical crime data service 113 may return an amount of incidents that have occurred in the underlying geographic area.

In block 406, the server application 111 determines whether the current geographic location data matches with a location identified as historically being associated with high crime. For example, the server application 111 may do so based on whether the current coordinates match with a zip code for an area (or radius from the current coordinates) having a number of vehicular crime incidents exceeding a predefined threshold. If such a match exists, then the server application 111 may determine that the current location of the vehicle 102 is within a geographic location that might be associated with high crime based on the data. If so, then in block 408, the server application 111 generates a notification advising the user 104 that the vehicle 102 is approaching such an area and sends the notification to the device 106 and/or mobile application 109 for display to the user 104. If so, then in block 408, the server application 111 generates a notification to send to the device (e.g., the in-vehicle 106, the mobile device 108 via the mobile application 109, or the personal alert device 110).

In some embodiments, the server application 111 may propose alternative routes to the user 104 that may be associated with fewer vehicular crime incidents. In block 410, the server application 111 may identify one or more alternative routes (e.g., using shortest path algorithms, graph algorithms, hierarchical routing, etc.) and analyze the routes against the data provided by the historical crime data service 113 to identify which routes are of less risk of vehicular crime based on the number of historical crime incidents. In block 412, the server application 111 determines whether alternative routes are available that are of less risk. If so, then in block 414, the server application 111 transmits the alternative routes to the in-vehicle device 106 (or to the mobile device 108 via the mobile application 109, to the personal alert device 110, etc.).

FIG. 5 illustrates a method 500 for mitigating vehicle theft in situations in which the vehicle 102 is parked, according to an embodiment. As shown, the method 500 begins in block 502, in which the in-vehicle device 106 (or server application 111) receives a request from the user 104 to monitor the parked vehicle 102. In block 504, the in-vehicle device 106 (or server application 111) prompts the user for present trip information. In block 506, the in-vehicle device 106 (or server application 111) receives present trip information from the user 104, such as from the mobile device 108 (through the mobile application 109). For example, in block 508, the in-vehicle device 106 (or server application 111) receives destination, parking location, driver information, passenger information, and an estimated time of stay. In block 510, the in-vehicle device 106 (or server application 111) obtains geographic location information from the vehicle 102 and/or the devices of the user 104 (e.g., from the mobile device 108 or the personal alert device 110).

In block 512, the in-vehicle device 106 monitors the vehicle and vehicle surroundings via the sensors (e.g., sensors 212 in block 514 and/or in-vehicle sensors in block 516). In block 418, the in-vehicle device 106 enters the following loop while monitoring the vehicle 102 and until the user 104 returns to the vehicle or otherwise deactivates monitoring (e.g., via the mobile application 109). In block 520, the in-vehicle device 106 determines whether an anomalous event corresponding to a vehicle theft incident has occurred. For example, the in-vehicle device 106 may identify, based on observed audiovisual data, an individual attempting to enter the vehicle or strike the vehicle.

If no anomalous events have occurred, then the in-vehicle device 106 iterates the loop until the user 104 has deactivated monitoring via the mobile application 109. Otherwise, if the in-vehicle device 106 detects an anomalous event, then in block 422, the in-vehicle device 106 transmits the trip information, timestamp data, and monitored vehicle and surroundings data to the user 104 and the alert recipient entities 114. The in-vehicle device 106 may also use camera sensors to capture additional images associated with the event, such as of individuals in or around the vehicle at the time of the incident, as well as the local environment where the vehicle is located at the time of the event. Such images may also be sent along to the user 104 and alert recipient entities 114.

Figure 6:
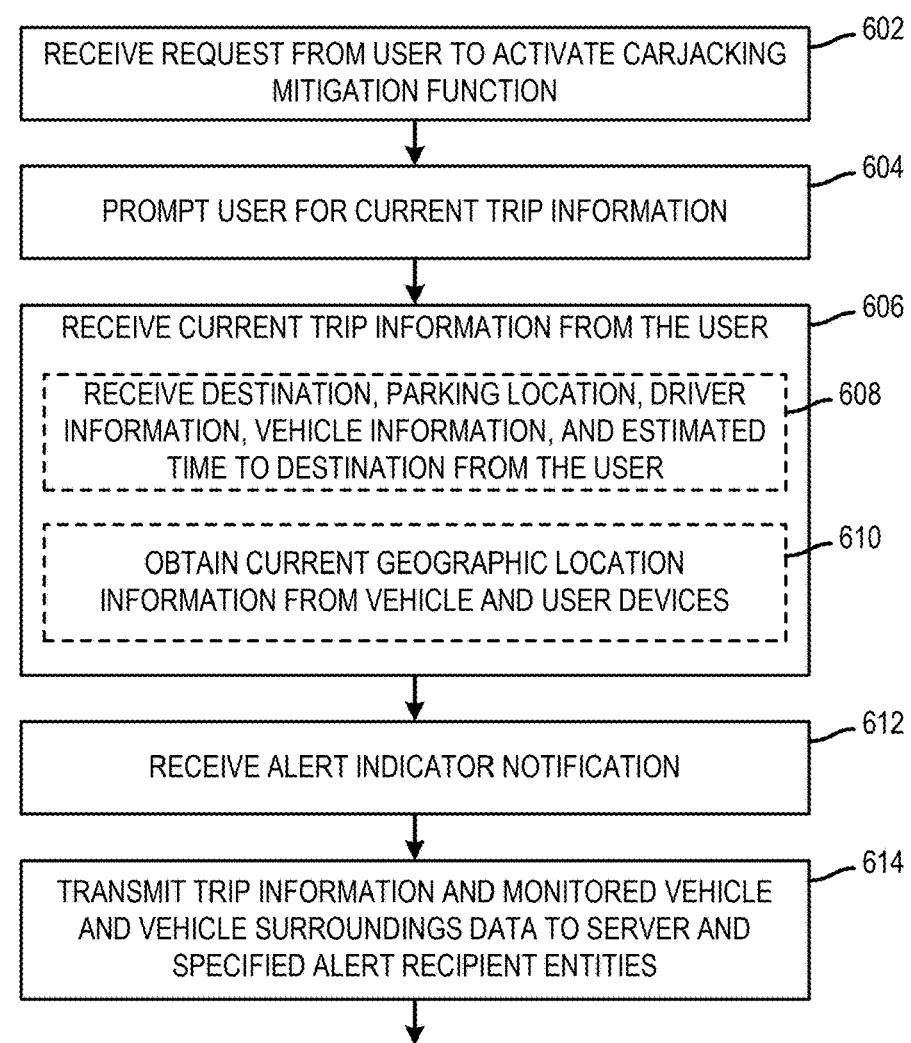
FIG. 6 is a flow diagram of a method for mitigating carjacking occurrences, according to an embodiment of the system.

FIG. 6 illustrates a method 600 for mitigating a vehicle theft incident, such as in the event of a carjacking incident. As shown, the method 600 begins in block 602, in which the in-vehicle device 106 (or server application 111) receives a request from the user 104 to activate a carjacking mitigation function. In block 604, the in-vehicle device 106 (or server application 111) receives present trip information from the user 104, such as from the mobile device 108 (through the mobile app). For example, in block 608, the in-vehicle device 106 (or server application 111) receives destination, parking location, driver information, passenger information, and an estimated time to destination. The in-vehicle device 106 may also receive information on intermediary destinations that the user 104 plans to travel to during the trip. In block 610, the in-vehicle device 106 (or server application 111) obtains geographic location information from the vehicle 102 and/or the devices of the user 104 (e.g., from the mobile device 108 or the personal alert device 110).

In the event of a carjacking, the user 104 may transmit an alert notification via the mobile application 109 executing on the mobile device 108 and/or the personal alert device 110 to the server 112 and alert recipient entities 114. Advantageously, if the user 104 is separated from the mobile device 108, the user 104 may still have access to the personal alert device 110 in the event that the personal alert device 110 is a wearable device (e.g., on the wrist, around the user's neck, etc.). The user 104 may then press a button on the personal alert device 110 to actuate the transmission of an alert signal to the server 112 and the alert recipient entities 114. Upon receipt of the alert signal, the server application 111 may, in turn, forward the trip information (previously sent to the server application 111) and other data to the alert recipient entities 114. In an embodiment, the in-vehicle device 106 may also be triggered to activate camera sensors within the vehicle 102 and transmit a stream of the images to the server 112 and/or the alert recipient entities 114. In an embodiment, the server 112 may transmit the stream of images to the alert recipient entities 114.

In some embodiments, the user 104 may, via the mobile application 108, activate a microphone device on the in-vehicle device 106 to attempt communication with an unauthorized individual within the vehicle 102. Additionally, the user 104 can permit law enforcement access to the in-vehicle device 106 to talk directly to an unauthorized who occupies a motor vehicle while committing car burglary, car theft or carjacking. All verbal communication and conversations made via the in-vehicle device 106 may be permanently stored in blockchain 120 for evidence in case the unauthorized individual is arrested.

Further, if the vehicle 102 is carjacked with a passenger inside who is age 16 or younger, the server application 111 may notify Amber Alert, enabling the police to negotiate with the individual to release the minor passenger. The in-vehicle device 106 may record all verbal communication and conversations and permanently store the data in the blockchain 120 for evidence in case a criminal is apprehended for car burglary, car theft or carjacking of the vehicle 102.

In some embodiments, the user 104 may activate the personal alert device 110 (e.g., via press of a button thereon) to cause the in-vehicle device 106 to emit a noise. For example, if, immediately following a carjacking incident, the user 104 is within a networkable proximity from the vehicle 102, the personal alert device 110 may maintain a networked connection with the in-vehicle device 106 and server 112. The personal alert device 110 may transmit a signal to the in-vehicle device 106 and/or server 112 to cause the in-vehicle device 106 to emit the noise. For instance, the in-vehicle device 106 may receive a signal from the personal alert device 110 (or from the server application 111 in response to receipt of the signal) to indicate to the in-vehicle device 106 to play a noise, such as a disturbing sound (e.g., firecrackers), to distract unauthorized individuals. The in-vehicle device 106 may generate sounds at 120 decibels for a duration of time (e.g., 20 to 30 seconds) to distract the individual, as reports have indicated that it difficult for a human being to endure hearing sounds for a period of time at 120 decibels inside a motor vehicle. In an embodiment, the feature can be limited to one activation per incident to avoid disrupting the general public. Such techniques are advantageous compared to prior art car alarm noises, as present vehicle security systems (e.g., car alarms, dash cams) do not generate sounds such as firecracker noises to curb and deter criminals.

While the foregoing is directed to embodiments of the present disclosure, other and further embodiments of the disclosure may be devised without departing from the basic scope thereof, and the scope thereof may be determined by the example claims that follow.

We claim:

1. A system for mitigating occurrences of vehicular crime, the system comprising:
   an in-vehicle device comprising:
      a plurality of audio and video sensors for capturing audiovisual data and surroundings of a vehicle, wherein the in-vehicle device is integrated with telematics equipment of the vehicle;
   a server comprising:
      one or more processors; and
      a memory storing a plurality of instructions, which when executed on the one or more processors, causes the server to:
   receive present trip information of a mobile device of a user of the vehicle;
   monitor the vehicle and the surroundings of the vehicle based on the audiovisual data and the surroundings captured by the in-vehicle device;
   upon detection of anomalous activity at the vehicle and the surroundings, transmit the present trip information to one or more alert recipient entities; and
   record the present trip information of the user in a blockchain; and
   a personal alert device of the user configured to transmit alert signals to one or more devices, wherein the personal alert device is wirelessly connected with the in-vehicle device, the server, and the mobile device, wherein the plurality of instructions further causes the server to:
   receive an alert signal from the personal alert device, the alert signal transmitted in response to an activation of the personal alert device by the user; and
   transmit the present trip information to one or more alert recipient entities.

2. The system of claim 1, wherein the present trip information comprises a destination, parking location, driver information, and vehicle information, and present geolocation information associated with the vehicle.

3. The system of claim 1, wherein the plurality of instructions further causes the server to:
   receive a second signal from the personal alert device; and
   cause the in-vehicle device to emit a noise.

4. The system of claim 3, wherein causing the in-vehicle device to emit a noise further comprises causing the in-vehicle device to emit the noise at 120 decibels for a predefined duration.

5. The system of claim 1, wherein the plurality of instructions further causes the server to:
   receive a current geographic location of the vehicle;
   determine, based on historical crime statistics, whether the current geographic location corresponds to an area in which vehicular crime incidents exceed a specified threshold; and
   upon a determination that the current geographic location corresponds to an area in which vehicular crime incidents exceed a specified threshold, transmitting a notification to the mobile device.

6. The system of claim 5, wherein the plurality of instructions further causes the server to:

identify one or more alternative routes relative to the present trip information;

transmit the one or more alternative routes to the mobile device.

7. A method for mitigating occurrences of vehicular crime, comprising:

receiving present trip information of a mobile device of a user of the vehicle;

monitoring the vehicle and surroundings of the vehicle via an in-vehicle device comprising a plurality of audio and video sensors for capturing audiovisual data and the surroundings, wherein the in-vehicle device is integrated with telematics equipment of the vehicle;

receiving an alert signal from a personal alert device associated with the user;

upon detecting anomalous activity at the vehicle and the surroundings and in response to receiving the alert signal from the personal alert device, transmit the present trip information to one or more alert recipient entities, wherein the alert signal is transmitted in response to an activation of the personal alert device by the user; and recording the present trip information of the user in a blockchain.

8. The method of claim 7, wherein the present trip information comprises a destination, parking location, driver information, and vehicle information, and present geolocation information associated with the vehicle.

9. The method of claim 7, further comprising:

receiving a second signal from the personal alert device; and causing the in-vehicle device to emit a noise.

10. The method of claim 9, wherein causing the in-vehicle device to emit a noise further comprises causing the in-vehicle device to emit the noise at 120 decibels for a predefined duration.

11. The method of claim 7, further comprising:

receiving a current geographic location of the vehicle;

determining, based on historical crime statistics, whether the current geographic location corresponds to an area in which vehicular crime incidents exceed a specified threshold; and upon determining that the current geographic location corresponds to an area in which vehicular crime incidents exceed a specified threshold, transmitting a notification to the mobile device.

12. The method of claim 11, further comprising:

identifying one or more alternative routes relative to the present trip information;

transmitting the one or more alternative routes to the mobile device.

13. One or more non-transitory computer-readable storage media storing a plurality of instructions, which, when executed on one or more processors, causes a server to:

receive present trip information of a mobile device of a user of the vehicle;

monitor the vehicle and surroundings of the vehicle via an in-vehicle device comprising a plurality of audio and video sensors for capturing audiovisual data and the surroundings, wherein the in-vehicle device is integrated with telematics equipment of the vehicle;

receive an alert signal from a personal alert device associated with the user;

upon detection of anomalous activity at the vehicle and the surroundings and in response to receiving the alert signal from the personal alert device, transmit the present trip information to one or more alert recipient entities, wherein the alert signal is transmitted in response to an activation of the personal alert device by the user; and record the present trip information of the user in a blockchain.

14. The one or more non-transitory computer-readable storage media of claim 13, wherein the present trip information comprises a destination, parking location, driver information, and vehicle information, and present geolocation information associated with the vehicle.

15. The one or more non-transitory computer-readable storage media of claim 13, wherein the plurality of instructions further causes the server to:

receive a second signal from the personal alert device; and cause the in-vehicle device to emit a noise at 120 decibels for a predefined duration.

16. The one or more non-transitory computer-readable storage media of claim 13, wherein the plurality of instructions further causes the server to:

receive a current geographic location of the vehicle;

determine, based on historical crime statistics, whether the current geographic location corresponds to an area in which vehicular crime incidents exceed a specified threshold; and upon a determination that the current geographic location corresponds to an area in which vehicular crime incidents exceed a specified threshold, transmitting a notification to the mobile device.

17. The one or more non-transitory computer-readable storage media of claim 16, wherein the plurality of instructions further causes the server to:

identify one or more alternative routes relative to the present trip information;

transmit the one or more alternative routes to the mobile device.

* * * * *